(12) United States Patent
Agashe et al.

(10) Patent No.: US 8,538,419 B2
(45) Date of Patent: Sep. 17, 2013

(54) METHOD AND APPARATUS TO ENABLE PATCHING OF USER EQUIPMENT CONTEXT THROUGH RETRIEVAL OF PARTIAL CONTEXTS FROM VARIOUS NETWORK SERVERS

(75) Inventors: Parag A. Agashe, San Diego, CA (US); Osok Song, San Diego, CA (US); Adrian E. Escott, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 12/614,106

(22) Filed: Nov. 6, 2009

(65) Prior Publication Data

US 2010/0120420 A1 May 13, 2010

Related U.S. Application Data

(60) Provisional application No. 61/113,166, filed on Nov. 10, 2008.

(51) Int. Cl.
*H04W 4/00* (2009.01)
*H04W 36/00* (2009.01)

(52) U.S. Cl.
USPC ................. 455/432.1; 455/436; 455/440

(58) Field of Classification Search
USPC .............. 455/432.1, 426.1, 436–442, 448; 370/331, 328, 338
See application file for complete search history.

(56) References Cited

U.S. PATENT DOCUMENTS

| | | | | |
|---|---|---|---|---|
| 2007/0249352 A1* | 10/2007 | Song et al. | ...................... | 455/436 |
| 2008/0188223 A1* | 8/2008 | Vesterinen et al. | ............ | 455/436 |
| 2008/0259873 A1* | 10/2008 | Ahmavaara et al. | ........... | 370/331 |
| 2008/0261600 A1* | 10/2008 | Somasundaram et al. | ..... | 455/436 |
| 2009/0279502 A1* | 11/2009 | Zheng et al. | ................... | 370/331 |
| 2010/0246533 A1* | 9/2010 | Lundin et al. | ................. | 370/332 |

FOREIGN PATENT DOCUMENTS

WO 2008020788 A1 2/2008

OTHER PUBLICATIONS

GSM: "3GPP TS 23.401 v8.1.0 (Mar. 2008): 3rd Generation Partnership Project; Technical Specification Group Services and System Aspects; General Packet Radio Service (GPRS) enhancements for Evolved Universal Terrestrial Radio Access Netwroks (E-UTRAN) access (Release 8)," (Mar. 1, 2008), XP007908122.
International Search Report—PCT/US09/063765, International Search Authority—European Patent Office—Mar. 25, 2010.
Nokia Siemens Networks, Nokia: "Correction of pre-Rel-8 SGSN to MME TAU procedure," 3GPP Draft TSG SA WG2 Meeting #63, ; TD S2-081503, Athens, Greece; (Feb. 18, 2008), XP050263873.
Written Opinion—PCT/US2009/063765—ISA/EPO—Mar. 25, 2010.
Taiwan Search Report—TW098138153—TIPO—Oct. 19, 2012.

\* cited by examiner

*Primary Examiner* — Brandon Miller
(74) *Attorney, Agent, or Firm* — Florin Corie

(57) ABSTRACT

Devices and methods are provided for the patching of a UE context via retrieval of partial contexts when a UE transitions from a source system (e.g., UTRAN) to a target system (e.g., an LTE network). In one embodiment, the method may involve receiving a first identifier for a source system server (e.g., SGSN) storing first context information, and a second identifier for a target system server (e.g., MME) storing second context information. The method may involve retrieving and combining the first and second context information to generate the patched context for the UE.

47 Claims, 12 Drawing Sheets

METHOD AND APPARATUS TO ENABLE PATCHING OF USER EQUIPMENT CONTEXT THROUGH RETRIEVAL OF PARTIAL CONTEXTS FROM VARIOUS NETWORK SERVERS

CLAIM OF PRIORITY UNDER 35 U.S.C. §119

The present Application for Patent claims priority to Provisional Application No. 61/113,166 entitled "METHOD AND APPARATUS TO ENABLE PATCHING OF USER EQUIPMENT CONTEXT THROUGH RETRIEVAL OF PARTIAL CONTEXTS FROM VARIOUS NETWORK SERVERS," filed Nov. 10, 2008, and assigned to the assignee hereof and hereby expressly incorporated by reference herein.

BACKGROUND

1. Field

The present application relates generally to wireless communications, and more specifically to methods and systems for retrieving and using stored context information when a user equipment (UE) transitions between different wireless systems.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems may include code division multiple access (CDMA) systems, time division multiple access (TDMA) systems, frequency division multiple access (FDMA) systems, Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

3rd Generation Partnership Project (3GPP) LTE complements the success of High Speed Packet Access (HSPA) with higher peak data rates, lower latency and an enhanced broadband experience in high-demand areas. This is accomplished with the use of wider-spectrum bandwidths, OFDMA and Single-Carrier FDMA (SC-FDMA) air interfaces, and advanced antenna techniques. These techniques enable high spectral efficiency and an excellent user experience for a wide range of converged IP services. For example, Universal Mobile Telecommunication System (UMTS) operators are rapidly adopting and offering IP services such as rich multimedia (e.g., video-on-demand, music download, video sharing), VoIP, PTT and broadband access to laptops and PDAs.

With the deployment of a multitude of wireless technologies worldwide and support for these technologies in mobile multimode devices or user equipment (UE), there is a growing need for uninterrupted connections between UEs and Radio Network Controllers (RNCs) of different Radio Access Networks (RANs). In a heterogeneous wireless access environment that includes, for example, UMTS Terrestrial Radio Access Network (UTRAN) and LTE technologies, it is imperative that LTE-capable systems and UEs be equipped to handle transitions between the different RANs in a seamless manner. Accordingly, there is a need for techniques that allow for the efficient retrieval of utilization of context information from the source and/or target RANs.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with methods for patching a UE context via retrieval of partial contexts when a UE transitions from a source system (e.g., UTRAN) to a target system (e.g., an LTE network). The method may be performed at a server or other network entity of the target system.

The method may involve receiving at least two identifiers from a UE, wherein the at least two identifiers may comprise: a first identifier for identifying a source system server storing first context information associated with the UE; and a second identifier for identifying a target system server storing second context information associated with the UE.

The method may involve using the first and second identifiers to retrieve (a) a first context from the source system server and (b) a second context from the target system server. The method may involve combining the two sets of contexts to generate a patched context for the UE.

In one embodiment, the source system server is associated with a first Radio Access Network (RAN) and the target system server is associated with a second RAN. For example, the first RAN may comprise a UMTS Terrestrial Radio Access Network (UTRAN). The second RAN may comprise an LTE network.

For example, the UE may transition from the UTRAN to the LTE network. The source system server may comprise a SGSN of the UTRAN system. The target system server may comprise an MME of the LTE system. If the method is being performed by a first MME of the LTE system, then the target system server may comprise a second MME of the LTE system. For example, the second MME may maintain a previously stored LTE context for the UE.

In related aspects, the step of using the at least two identifiers may comprise: using the first identifier to retrieve a UTRAN context from the SGSN; and using the second identifier to retrieve the LTE context from the MME. In further related aspects, the method may comprise combining the LTE context with the UTRAN context to generate the patched context for the UE.

In accordance with one or more embodiments and corresponding disclosure thereof, various aspects are described in connection with devices and apparatuses for patching a UE context via retrieval of partial contexts. For example, there is provided an apparatus that may be configured as a server or as a processor for use within the server or as a similar network entity/device.

In one embodiment, the apparatus may comprise a transceiver module for receiving at least two identifiers from a UE, wherein the at least two identifiers may comprise: (a) a first identifier for identifying a source system server storing first context information associated with the UE; and (b) a second identifier for identifying a target system server storing second context information associated with the UE. The apparatus may comprise at least one processor operatively coupled with the transceiver module, as well as a memory module operatively coupled with the at least one processor and comprising executable code for the at least one processor.

For example, the memory module may comprise instructions for the at least one processor to use the first and second identifiers to retrieve (a) a first context from the source system server (e.g., SGSN) and (b) a second context from the target system server (e.g., MME). The memory module may comprise instructions for the at least one processor to combine the first and second contexts to generate a patched context for the UE.

In one embodiment, the source system server is associated with a first RAN (e.g., UTRAN) and the target system server is associated with a second RAN (e.g., LTE network). For example, the UE may transition from the UTRAN to the LTE network. The source system server may comprise a SGSN of the UTRAN system. The target system server may comprise a MME of the LTE system. For example, at least one MME of a plurality of MMEs of the LTE network may maintain a previously stored LTE context for the UE.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
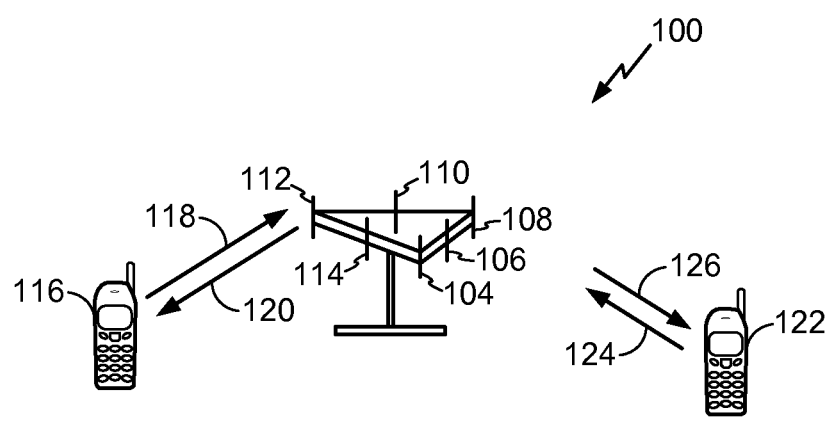
FIG. 1 illustrates a multiple access wireless communication system according to one embodiment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single Carrier Frequency Division Multiple Access (SC-FDMA) systems may utilize single carrier modulation and frequency domain equalization, and may have similar performance and essentially the same overall complexity as those of OFDMA systems. A SC-FDMA signal generally has lower Peak-to-Average Power Ratio (PAPR) because of its inherent single carrier structure. SC-FDMA has drawn great attention, especially for uplink communications where lower PAPR greatly benefits the mobile terminal in terms of transmit power efficiency, and is currently a working assumption for uplink multiple access schemes in 3GPP LTE or E-UTRA. For the purposes of the present document, the following abbreviations apply:

AM Acknowledged Mode
AMD Acknowledged Mode Data
ARQ Automatic Repeat Request
BCCH Broadcast Control Channel
BCH Broadcast Channel
CCCH Common Control Channel
CCH Control Channel
CCTrCH Coded Composite Transport Channel
CP Cyclic Prefix
CRC Cyclic Redundancy Check
CTCH Common Traffic Channel
DCCH Dedicated Control Channel
DCH Dedicated Channel
DL Downlink
DL-SCH Downlink Shared Channel
DSCH Downlink Shared Channel
DTCH Dedicated Traffic Channel
FACH Forward link Access Channel
FDD Frequency Division Duplex
GPRS General Packet Radio Service
L1 Layer 1 (physical layer)
L2 Layer 2 (data link layer)

L3 Layer 3 (network layer)
LI Length Indicator
LSB Least Significant Bit
MAC Medium Access Control
MBMS Multimedia Broadcast Multicast Service
MBSFN Multicast Broadcast Single Frequency Network
MCE MBMS Coordinating Entity
MCH Multicast Channel
MRW Move Receiving Window
MSB Most Significant Bit
MSCH MBMS point-to-multipoint Scheduling Channel
MTCH MBMS point-to-multipoint Traffic Channel
PCCH Paging Control Channel
PCH Paging Channel
PDCCH Physical Downlink Control Channel
PDSCH Physical Downlink Shared Channel
PDU Protocol Data Unit
PHY Physical Layer
PhyCH Physical Channel
RACH Random Access Channel
RLC Radio Link Control
RRC Radio Resource Control
SAP Service Access Point
SDU Service Data Unit
SHCCH Shared channel Control Channel
SN Sequence Number
SUFI Super Field
TCH Traffic Channel
TDD Time Division Duplex
TFI Transport Format Indicator
TM Transparent Mode
TMD Transparent Mode Data
TTI Transmission Time Interval
UE User Equipment
UL Uplink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network Referring to FIG. 1, a multiple access wireless communication system according to one embodiment is illustrated. An access point 100 (AP) may include multiple antenna groups, one including 104 and 106, another including 108 and 110, and an additional including 112 and 114. In FIG. 1, only two antennas are shown for each antenna group, however, more or fewer antennas may be utilized for each antenna group. Access terminal or user equipment (UE) 116 may be in communication with antennas 112 and 114, where antennas 112 and 114 transmit information to UE 116 over forward link 120 and receive information from UE 116 over reverse link 118. UE 122 is in communication with antennas 106 and 108, where antennas 106 and 108 transmit information to UE 122 over forward link 126 and receive information from UE 122 over reverse link 124. In an FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the AP. In the embodiment, antenna groups each are designed to communicate to UEs in a sector of the areas covered by AP 100. In communication over forward links 120 and 126, the transmitting antennas of AP 100 utilize beamforming in order to improve the signal-to-noise ratio of forward links for the different UEs 116 and 124. Also, an AP using beamforming to transmit to UEs scattered randomly through its coverage causes less interference to UEs in neighboring cells than an AP transmitting through a single antenna to all its UEs.

In accordance with aspects of the embodiments described herein, there is provided a multiple-in-multiple-out (MIMO) system that employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 2:
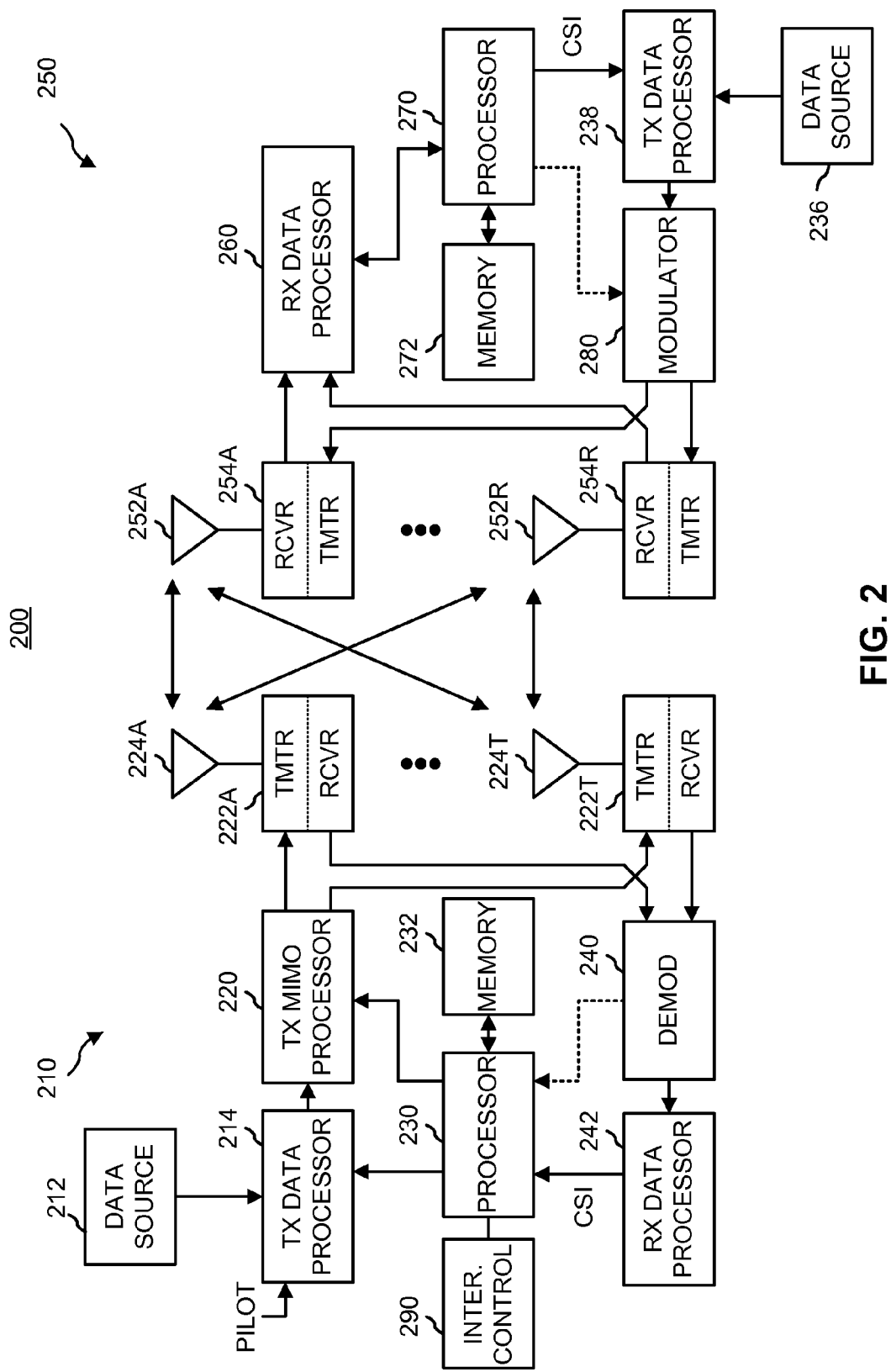
FIG. 2 illustrates a block diagram of a communication system.

The teachings herein may be incorporated into a node (e.g., a device) employing various components for communicating with at least one other node. FIG. 2 depicts several sample components that may be employed to facilitate communication between nodes. Specifically, FIG. 2 illustrates a wireless device 210 (e.g., an access point) and a wireless device 250 (e.g., a UE) of a MIMO system 200. At the device 210, traffic data for a number of data streams is provided from a data source 212 to a transmit ("TX") data processor 214.

In some aspects, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase-Shift Keying (QPSK), M-ary Phase Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230. A data memory 232 may store program code, data, and other information used by the processor 230 or other components of the device 210.

The modulation symbols for all data streams are then provided to a TX MIMO processor 220, which may further process the modulation symbols (e.g., for OFDM). The TX MIMO processor 220 then provides $N_T$ modulation symbol streams to $N_T$ transceivers ("XCVR") 222A through 222T. In some aspects, the TX MIMO processor 220 applies beam-forming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 222A through 222T are then transmitted from $N_T$ antennas 224A through 224T, respectively.

At the device 250, the transmitted modulated signals are received by NR antennas 252A through 252R and the received signal from each antenna 252 is provided to a respective transceiver ("XCVR") 254A through 254R. Each transceiver 254 conditions (e.g., filters, amplifies, and downconverts) a respective received signal, digitizes the conditioned signal to provide samples, and further processes the samples to provide a corresponding "received" symbol stream.

A receive ("RX") data processor 260 then receives and processes the NR received symbol streams from NR transceivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the device 210.

A processor 270 periodically determines which pre-coding matrix to use (discussed below). The processor 270 formulates a reverse link message comprising a matrix index portion and a rank value portion. A data memory 272 may store program code, data, and other information used by the processor 270 or other components of the device 250.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by the transceivers 254A through 254R, and transmitted back to the device 210.

At the device 210, the modulated signals from the device 250 are received by the antennas 224, conditioned by the transceivers 222, demodulated by a demodulator ("DEMOD") 240, and processed by a RX data processor 242 to extract the reverse link message transmitted by the device 250. The processor 230 then determines which pre-coding matrix to use for determining the beam-forming weights then processes the extracted message. It should be appreciated that for each device 210 and 250 the functionality of two or more of the described components may be provided by a single component.

In accordance with one aspect of the embodiments described herein, logical channels may be classified into Logical Control Channels and Logical Traffic Channels. The Logical Control Channels may comprise: a BCCH which is a DL channel for broadcasting system control information; a PCCH which is a DL channel that transfers paging information; and/or a MBMS point-to-multipoint Control Channel which is a point-to-multipoint DL channel used for transmitting MBMS scheduling and control information for one or several MTCHs. Generally, after establishing an RRC connection this channel is used by ATs that receive MBMS. In the alternative, or in addition, the Logical Control Channels may comprise DCCH which is a point-to-point bi-directional channel that transmits dedicated control information, and may be used by ATs having an RRC connection. In accordance with another aspect of the embodiments described herein, the Logical Traffic Channels may comprise: a DTCH which is a point-to-point bi-directional channel, dedicated to one AT for the transfer of user information; and/or a MTCH which is a point-to-multipoint DL channel for transmitting traffic data.

In accordance with one aspect, Transport Channels may be classified into DL and UL. The DL Transport Channels may comprise: a BCH, a Downlink Shared Data Channel (DL-SDCH) and a PCH, the PCH for support of UE power saving (DRX cycle is indicated by the network to the UE), broadcasted over entire cell and mapped to PHY resources which can be used for other control/traffic channels. The UL Transport Channels may comprise a RACH, a Request Channel (REQCH), an Uplink Shared Data Channel (UL-SDCH), and/or a plurality of PHY channels. The PHY channels may comprise a set of DL channels and UL channels.

The DL PHY channels may comprise: a Common Pilot Channel (CPICH); Synchronization Channel (SCH); a CCCH; a Shared DL Control Channel (SDCCH); a Multicast Control Channel; a Shared UL Assignment Channel (SUACH); an Acknowledgement Channel (ACKCH); a DL Physical Shared Data Channel (DL-PSDCH); an UL Power Control Channel (UPCCH); a Paging Indicator Channel (PICH); and/or a Load Indicator Channel (LICH).

The UL PHY channels may comprise: a Physical Random Access Channel (PRACH); a Channel Quality Indicator Channel (CQICH); an ACKCH; an Antenna Subset Indicator Channel (ASICH); a Shared Request Channel (SREQCH); an UL Physical Shared Data Channel (UL-PSDCH); and/or a Broadband Pilot Channel (BPICH).

In related aspects, a channel structure is provided that preserves low Peak-to-Average Power Ratio (PAR) (at any given time, the channel is contiguous or uniformly spaced in frequency) properties of a single carrier waveform.

In some aspects, the teachings herein may be employed in a network that includes macro scale coverage (e.g., a large area cellular network such as a 3G networks, typically referred to as a macro cell network) and smaller scale coverage (e.g., a residence-based or building-based network environment). As a UE moves through such a network, the UE may be served in certain locations by access nodes (ANs) that provide macro coverage while the UE may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, Evolved Node-B (eNodeB), macro cell, and so on. Also, a femto node may be configured or referred to as a Home Node-B (HNB), Home eNodeB (HeNB), AP base station, femto cell, and so on.

In addition, a new class of small base stations has emerged, which may be installed in a user's home and provide indoor wireless coverage to mobile units using existing broadband Internet connections. Such a base station is generally known as an Access Point (AP) base station, but may also be referred to as HNB unit, HeNB unit, femto cell, femto Base Station (fBS), base station, or base station transceiver system. Typically, the AP base station is connected to the Internet and the mobile operator's network via a Digital Subscriber Line (DSL), cable internet access, T1/T3, or the like, and offers typical base station functionality, such as Base Transceiver Station (BTS) technology, radio network controller, and gateway support node services. This allows a UE, also referred to as a cellular/mobile device or handset, or access terminal (AT), to connect to the AP base station and utilize the wireless service. UEs can include, for example, cellular phones, smart phones, laptops, handheld communication devices, handheld computing devices, satellite radios, navigational devices, Personal Digital Assistants (PDAs), or any other suitable device for communicating over a wireless communication system.

Figure 3A:
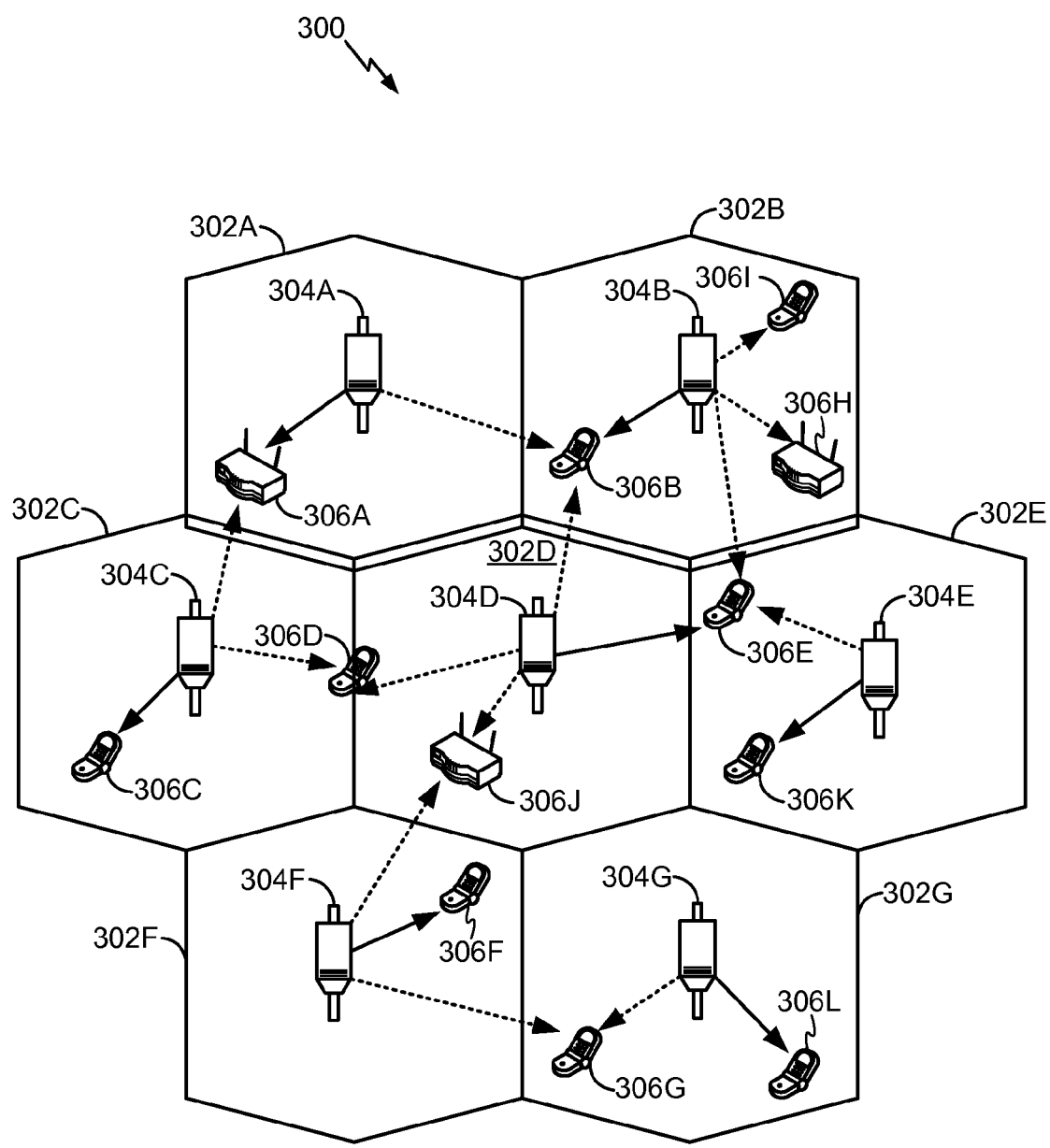
FIGS. 3A-C illustrate aspects of deployment of access point base stations within a network environment.

FIG. 3A illustrates a wireless communication system 300, configured to support a number of users, in which the teachings herein may be implemented. The system 300 provides communication for multiple cells 302, such as, for example, macro cells 302A-302G, with each cell being serviced by a corresponding access node 304 (e.g., access nodes 304A-304G). As shown in FIG. 3, UEs 306 (e.g., UEs 306A-306L) may be dispersed at various locations throughout the system over time. Each UE 306 may communicate with one or more access nodes 304 on a forward link and/or a reverse link at a given moment, depending upon whether the UE 306 is active and whether it is in soft handoff, for example. The wireless communication system 300 may provide service over a large geographic region. For example, macro cells 302A-302G may cover a few blocks in a neighborhood.

Figure 3B:
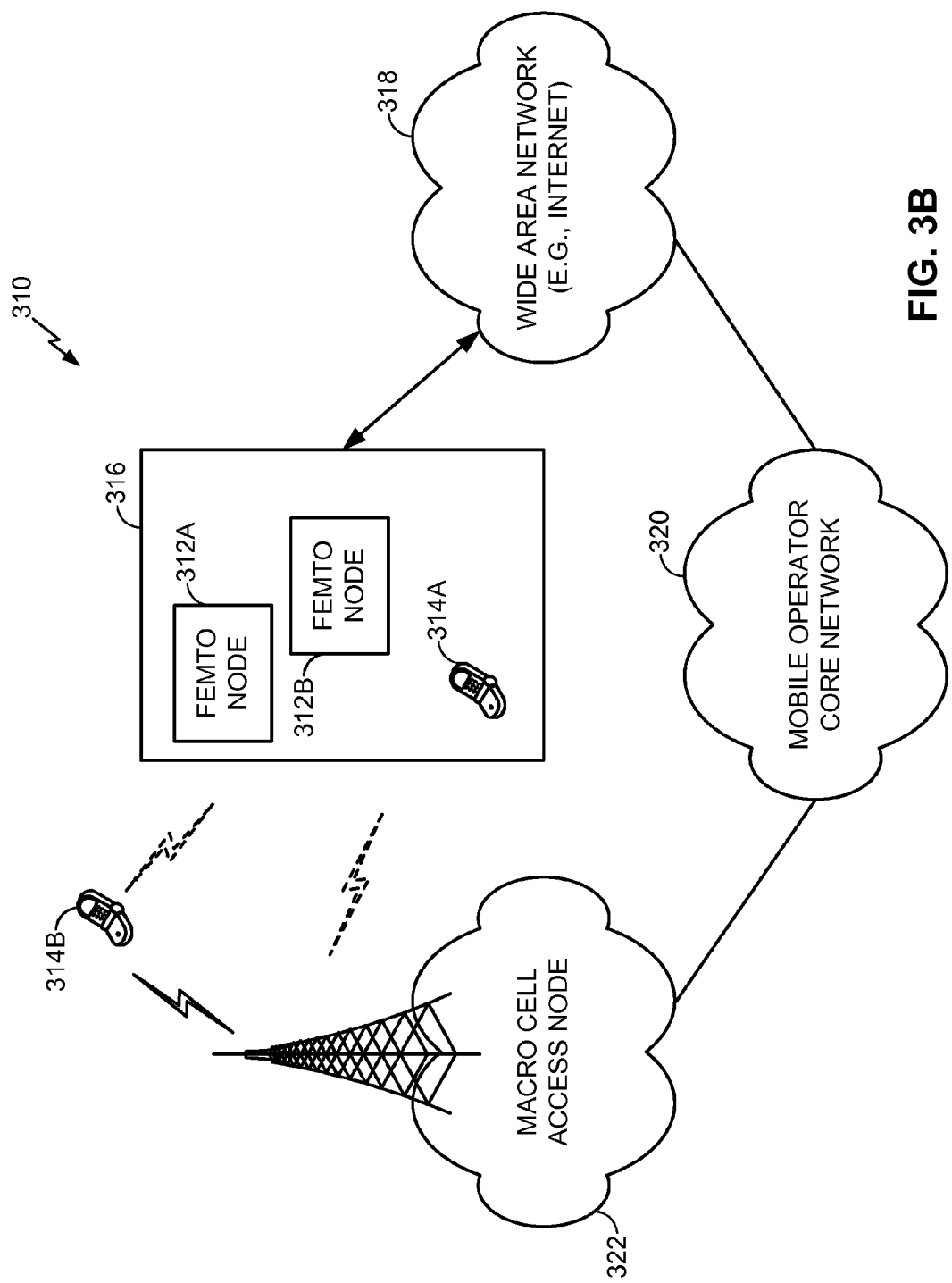

FIG. 3B illustrates an exemplary communication system 310 where one or more femto nodes are deployed within a network environment. Specifically, the system 310 includes multiple femto nodes 312 (e.g., femto nodes 312A and 312B) installed in a relatively small scale network environment (e.g., in one or more user residences 316). Each femto node 312 may be coupled to a wide area network 318 (e.g., the Internet) and a mobile operator core network 320 via a DSL router, a cable modem, a wireless link, or other connectivity means (not shown). As will be discussed below, each femto node 312 may be configured to serve associated UEs 314 (e.g., UE 314A) and, optionally, alien UEs 314 (e.g., UE 314B). In other words, access to femto nodes 312 may be restricted whereby a given UE 314 may be served by a set of designated (e.g., home) femto node(s) 312 but may not be served by any non-designated femto nodes 312 (e.g., a neighbor's femto node 312).

Figure 3C:
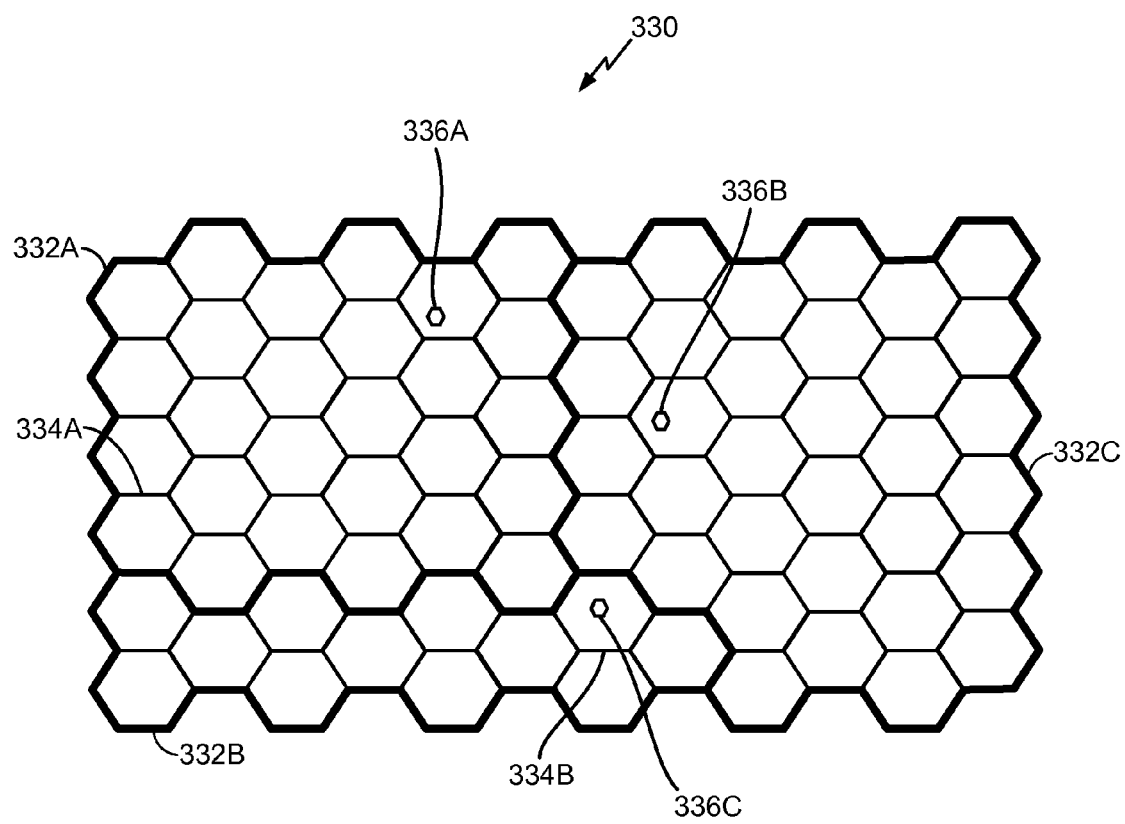

FIG. 3C illustrates an example of a coverage map 330 where several tracking areas 332 (or routing areas or location areas) are defined, each of which includes several macro coverage areas 334. Here, areas of coverage associated with tracking areas 332A, 332B, and 332C are delineated by the wide lines and the macro coverage areas 334 are represented by the hexagons. The tracking areas 332 also include femto coverage areas 336. In this example, each of the femto coverage areas 336 (e.g., femto coverage area 336C) is depicted within a macro coverage area 334 (e.g., macro coverage area 334B). It should be appreciated, however, that a femto coverage area 336 may not lie entirely within a macro coverage area 334. In practice, a large number of femto coverage areas 336 may be defined with a given tracking area 332 or macro coverage area 334. Also, one or more pico coverage areas (not shown) may be defined within a given tracking area 332 or macro coverage area 334.

Referring again to FIG. 3B, the owner of a femto node 312 may subscribe to mobile service, such as, for example, 3G mobile service, offered through the mobile operator core network 320. In addition, an UE 314 may be capable of operating both in macro network environments and in smaller scale (e.g., residential) network environments. In other words, depending on the current location of the UE 314, the UE 314 may be served by an access node 322 of the macro cell mobile network 320 or by any one of a set of femto nodes 312 (e.g., the femto nodes 312A and 312B that reside within a corresponding user residence 316). For example, when a subscriber is outside his home, he is served by a standard macro access node (e.g., node 322) and when the subscriber is at home, he is served by a femto node (e.g., node 312A). Here, it should be appreciated that a femto node 314 may be backward compatible with existing UEs 314.

A femto node 312 may be deployed on a single frequency or, in the alternative, on multiple frequencies. Depending on the particular configuration, the single frequency or one or more of the multiple frequencies may overlap with one or more frequencies used by a macro node (e.g., node 322).

In some aspects, an UE 314 may be configured to connect to a preferred femto node (e.g., the home femto node of the UE 314) whenever such connectivity is possible. For example, whenever the UE 314 is within the user's residence 316, it may be desired that the UE 314 communicate only with the home femto node 312.

In some aspects, if the UE 314 operates within the macro cellular network 320 but is not residing on its most preferred network (e.g., as defined in a preferred roaming list), the UE 314 may continue to search for the most preferred network (e.g., the preferred femto node 312) using a Better System Reselection ("BSR"), which may involve a periodic scanning of available systems to determine whether better systems are currently available, and subsequent efforts to associate with such preferred systems. With the acquisition entry, the UE 314 may limit the search for specific band and channel. For example, the search for the most preferred system may be repeated periodically. Upon discovery of a preferred femto node 312, the UE 314 selects the femto node 312 for camping within its coverage area.

A femto node may be restricted in some aspects. For example, a given femto node may only provide certain services to certain UEs. In deployments with so-called restricted (or closed) association, a given UE may only be served by the macro cell mobile network and a defined set of femto nodes (e.g., the femto nodes 312 that reside within the corresponding user residence 316). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of UEs. This set may be temporarily or permanently extended as necessary. In some aspects, a Closed Subscriber Group ("CSG") may be defined as the set of access nodes (e.g., femto nodes) that share a common access control list of UEs. A channel on which all femto nodes (or all restricted femto nodes) in a region operate may be referred to as a femto channel.

Various relationships may thus exist between a given femto node and a given UE. For example, from the perspective of an UE, an open femto node may refer to a femto node with no restricted association. A restricted femto node may refer to a femto node that is restricted in some manner (e.g., restricted for association and/or registration). A home femto node may refer to a femto node on which the UE is authorized to access and operate on. A guest femto node may refer to a femto node on which an UE is temporarily authorized to access or operate on. An alien femto node may refer to a femto node on which the UE is not authorized to access or operate on, except for perhaps emergency situations (e.g., 911 calls).

From a restricted femto node perspective, a home UE may refer to an UE that authorized to access the restricted femto node. A guest UE may refer to an UE with temporary access to the restricted femto node. An alien UE may refer to an UE that does not have permission to access the restricted femto node, except for perhaps emergency situations, for example, such as 911 calls (e.g., a UE that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given UE, and so on.

Figure 4:
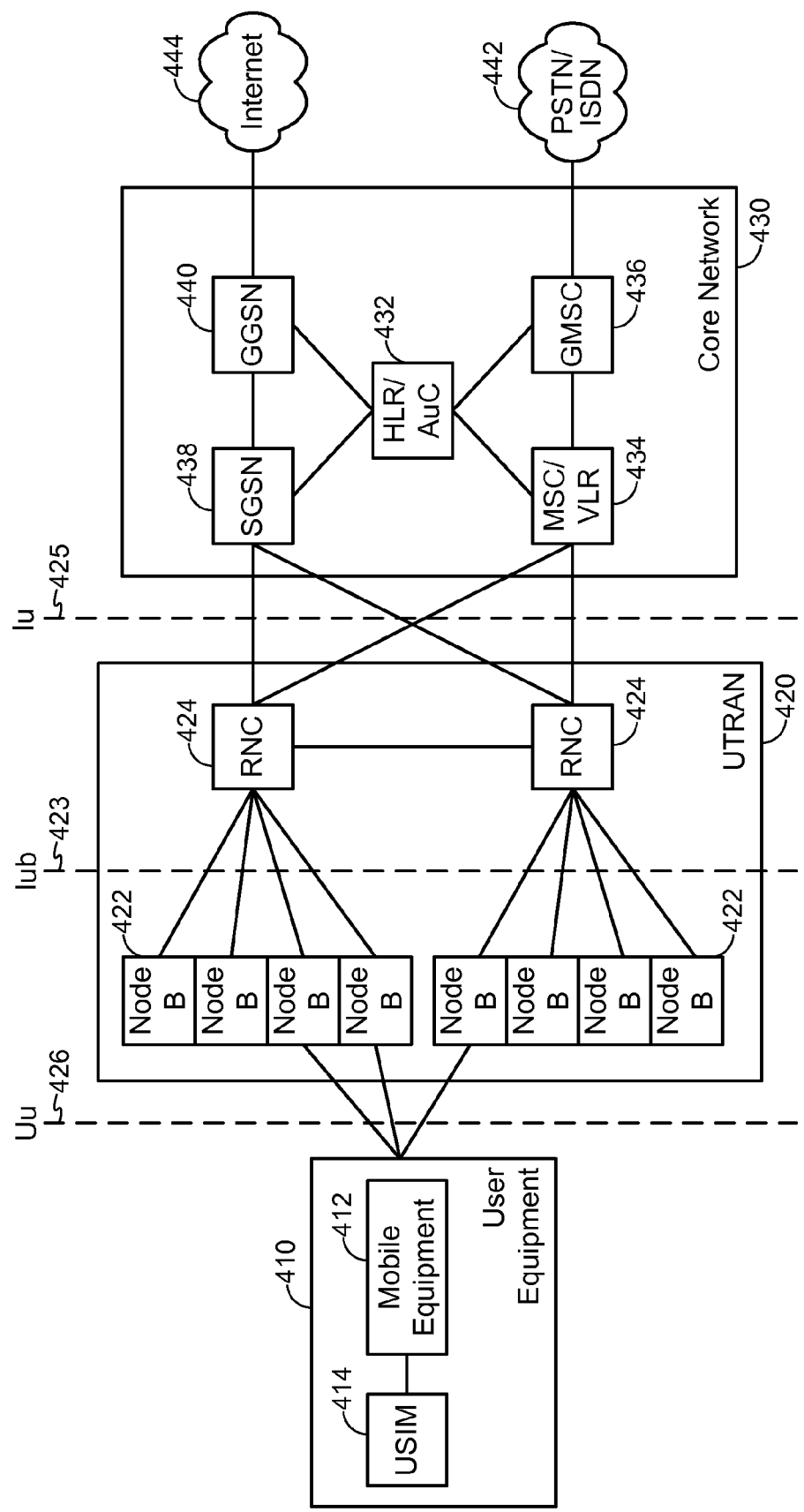
FIG. 4 provides a block diagram of a communications system according to a Universal Mobile Telecommunication System (UMTS) network topology.

With reference to FIG. 4, there is provided a block diagram of a communication system according to a UMTS network topology. A UMTS system includes UE 410, an access network 420, and a core network 430. The UE 410 is coupled to the access network which is coupled to the core network 430 which can be coupled to an external network.

The term "core network" may refer to refer to the switching and routing capability for connecting to either the Public Switched Telephone Network (PSTN) for circuit switched calls in the Circuit Switched (CS) domain, or the Public Switched Data Network (PSDN) for packet-switched calls in the Packet Switched (PS) domain. The term "core network" also refers to the routing capability for mobility and subscriber location management and for authentication services. The core network includes network elements needed for switching and subscriber control.

The UE 410 includes mobile equipment 412 and a Universal Subscriber Identity Module (USIM) 414 that contains a user's subscription information. The Cu interface not shown) is the electrical interface between the USIM 414 and the mobile equipment 412. The UE 410 is generally a device that allows a user to access UMTS network services. The UE 410 may be a mobile such as a cellular telephone, a fixed station, or other data terminal The mobile equipment 412 may comprise, for an example, a radio terminal used for radio communications over an air interface (Uu). The Uu interface 426 is the interface through which the UE accesses the fixed part of the system. The USIM is generally an application that resides on a smart card or other logic card that includes a microprocessor. The smart card holds the subscriber identity, performs authentication algorithms, and stores authentication in encryption keys and subscription information needed at the terminal.

The access network 420 includes the radio equipment for accessing the network. In a W-CDMA system, the access network 420 is the UTRAN air interface. The UTRAN includes at least one Radio Network Subsystem (RNS) that includes at least one base station or "Node B" 422 coupled to at least one Radio Network Controller (RNC) 424.

The RNCs 424 control the radio resources of the UTRAN. The RNCs 424 of the access network 420 communicate with the core network 430 via the Iu interface 425. The Uu interface 426, Iu interface 425, Iub interface 423, and Iur interface allow for internetworking between equipment from different vendors and are specified in the 3GPP standards. Implementation of the RNC varies from vendor to vendor, and therefore will be described in general terms below.

The RNC 424 serves as the switching and controlling element of the UTRAN, and is located between the Iub interface 423 and Iu interface 425. The RNC 424 acts as a service access point for all services the UTRAN provides to the core network 430, for example, management of connections to the UE 410. The Iub interface 423 connects a node B 422 and an RNC 424. The Iu interface 425 connects the UTRAN to the core network. The RNC 424 provides a switching point between the Iu bearer and the base stations. The UE 410 may have several radio bearers between itself and the RNC 424. The radio bearer is related to the UE context which is a set of definitions required by the Iub in order to arrange common connections and dedicated connections between the UE and RNC. The respective RNCs 424 may communicate with each other over an optional Iur interface that allows soft handover between cells connected to different nodes 422. The Iur interface thus allows for inter-RNC connections. In such cases, a serving RNC maintains the Iu connection 425 to the core network 430 and performs selector and outer loop power control functions, while a drift RNC transfers frames that can be exchanged over the Iur interface to mobile station 410 via one or more base stations 422.

The RNC that controls one node B 422 can be referred to as the controlling RNC of the node B, and controls the load and congestion of its own cells, and also executes admission control and code allocations for new radio links to be established in those cells.

RNCs and base stations (or Node Bs) can be connected via and communicate over the Iub interface 423. The RNCs control use of the radio resources by each base station 422 coupled to a particular RNC 424. Each base station 422 controls one or more cells and provides a radio link to the mobile station 410. The base station may perform interface processing such as channel coding and interleaving, rate adaptation and spreading. The base station also performs basic radio resource management operations such as the inter-loop power control. The base station 422 converts the data flow between the Iub and Uu interfaces 423, 426. The base station 422 also participates in radio resources management. An Uu interface 426 couples each base station 422 to the mobile station 410. The base stations can be responsible for radio transmission in one or more cells to the mobile station 410, and for radio reception in one or more cells from the mobile station 410.

The core network 430 includes all of the switching and routing capability for (1) connecting to either the PSTN 442 if a circuit switched call is present or to a Packet Data Network (PDN) if a packet-switched call is present, (2) mobility and subscriber location management, and (3) authentication services. The core network 430 can include a Home Location Register (HLR) 432, a Mobile Switching Center/Visitor Location Register (MSC/VLR) 434, a Gateway Mobile Switching Center (GMSC) 436, a Serving GPRS Support Node (SGSN) 438, and a Gateway GPRS Support Node (GGSN) 440.

The core network 430 may be coupled to an external circuit-switched (CS) network 442 that provides circuit-switched connections, such as PSTN or Integrated Services Digital Network (ISDN), if a packet switched call is present, or may be coupled to a PS network 444, such as the Internet, that provides connections for packet data services if a packet switched call is present.

Figure 5:
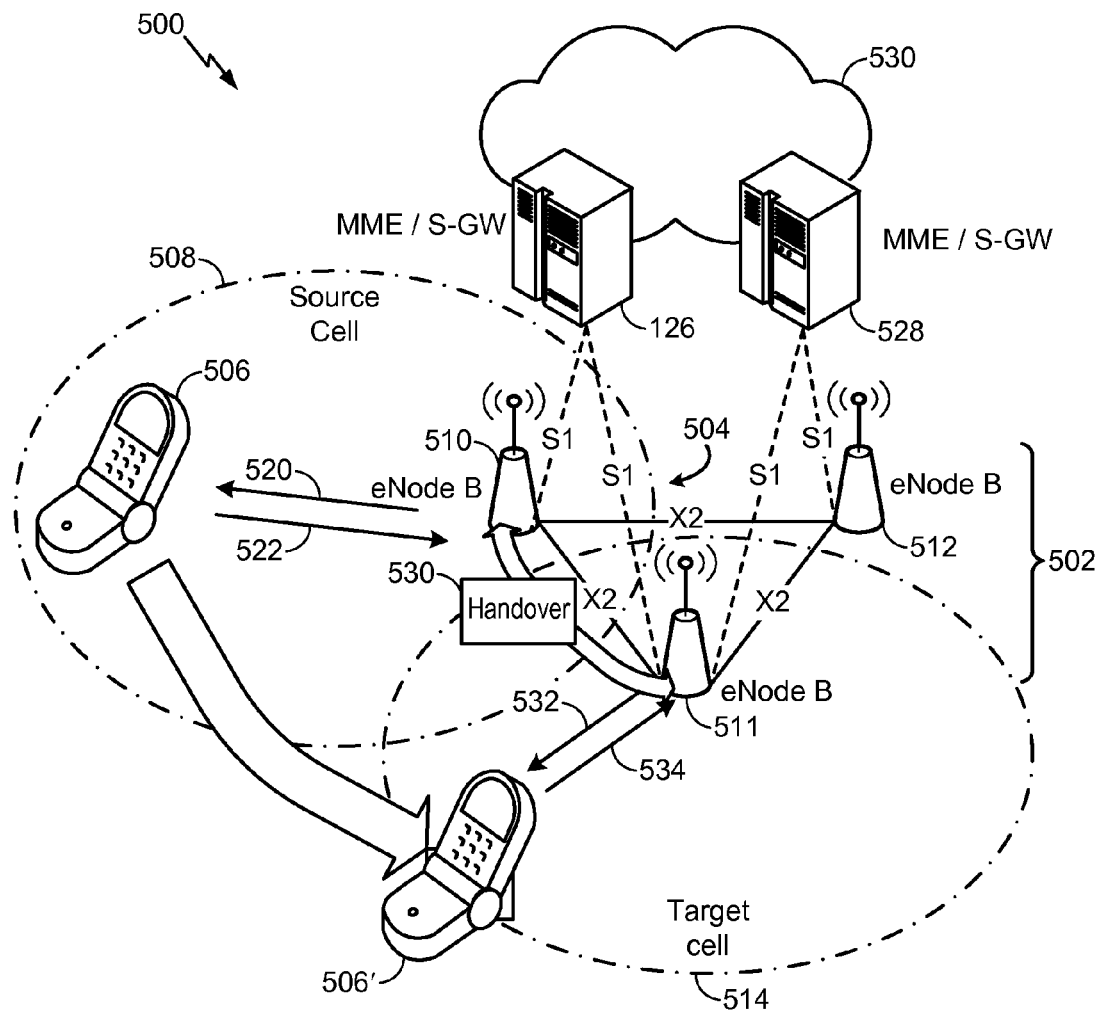
FIG. 5 illustrates a block diagram of a communication system that includes an Evolved UMTS Terrestrial Radio Access Network (E-UTRAN).

With reference to FIG. 5, in one embodiment, a communication system 500 includes an Evolved UMTS Terrestrial Radio Access Network (E-UTRAN) 502 that supports handover of UE 506 when moving (as depicted by 506') from an area or cell 508 covered by Evolved Node-B (eNodeB) 510 to a cell 514 covered by an eNodeB 511, in accordance with 3GPP LTE.

The eNodeBs 510-512 provide an Evolved UTRA (E-UTRA) user plane and control plane (RRC) protocol terminations towards the UE 506. The user plane may comprise 3GPP Packet Data Convergence Protocol (PDCP), RLC, MAC and PHY layer control. eNodeBs 510-512 may be interconnected with each other via an X2 interface ("X2") or the like. The eNodeBs 510-512 may also be connected via an S1 interface ("S1") to an EPC (Evolved Packet Core), and more specifically to Mobility Management Entities/Serving Gateways (MME/S-GW) 526, 528 connected to a data packet network 540. The S1 interface supports a many-to-many relation between MMEs/S-GW 526, 528 and eNodeBs 510-512. A distributed network function depicted as a handover 530 between eNodeBs 510, 511 utilizes the X2 network interface to control the handover 530 without reset of the RLC so that a new DL 532 and UL 534 in cell 514 can be achieved, completing delivery of in-transit PDUs and without loss of user data.

The eNodeBs 510-512 may host one or more of the following: radio resource management; radio bearer control; radio admission control; connection mobility control; dynamic allocation of resources to UEs in both UL and DL (scheduling); Internet Protocol (IP) header compression and encryption of user data stream; selection of an MME at UE attachment; routing of user plane data towards serving gateway; scheduling and transmission of paging messages (originated from the MME); scheduling and transmission of broadcast information; and measurement and measurement reporting configuration for mobility and scheduling.

Each MME may host one or more of the following: distribution of paging messages to the eNodeBs 510-512; security control; idle state mobility control; System Architecture Evolution (SAE) bearer control; ciphering and integrity protection of Non-Access Stratum (NAS) signaling.

In accordance with aspects of the particular subject of this disclosure, there are provided methods and apparatuses for the patching of UE context via retrieval of partial contexts from one or more network servers. Although embodiments described herein use 3GPP terminology, it is to be understood that the embodiments and described techniques may be applied to both 3GPP (Rel99, Rel5, Rel6, Rel7) technology and 3GPP2 (1xRTT, 1xEV-DO Rel0, RevA, RevB) technology, as well as other known and related technologies.

When the UE is idle, the UE context is typically maintained in a network server within the network, as well as maintained in the UE, in order to help the UE connect faster to the network. For example, the network server that stores the UE context may comprise an MME or, in the alternative, as a SGSN.

When the UE transitions from one system to another, the UE context is typically moved from the context network server that servers the source system to the network server that serves the target system. However, it may not be desirable to move the security context from the SGSN to the MME, for example, because the LTE system has better security. Thus, a new security context needs to be created when the UE transitions from the SGSN to the MME, which may lead to long disruptions. As a result, it would be advantageous to provide a method, apparatus and system to enable patching of the UE context by retrieving partial context information from separate servers and combining the partial context information to obtain the UE context.

In one embodiment, described in detail below, the UE context is maintained at the MME. When the UE transitions from an LTE system to a UTRAN system, for example, the UE context is moved to an SGSN, but the security context also remains stored at the MME.

Figure 6:
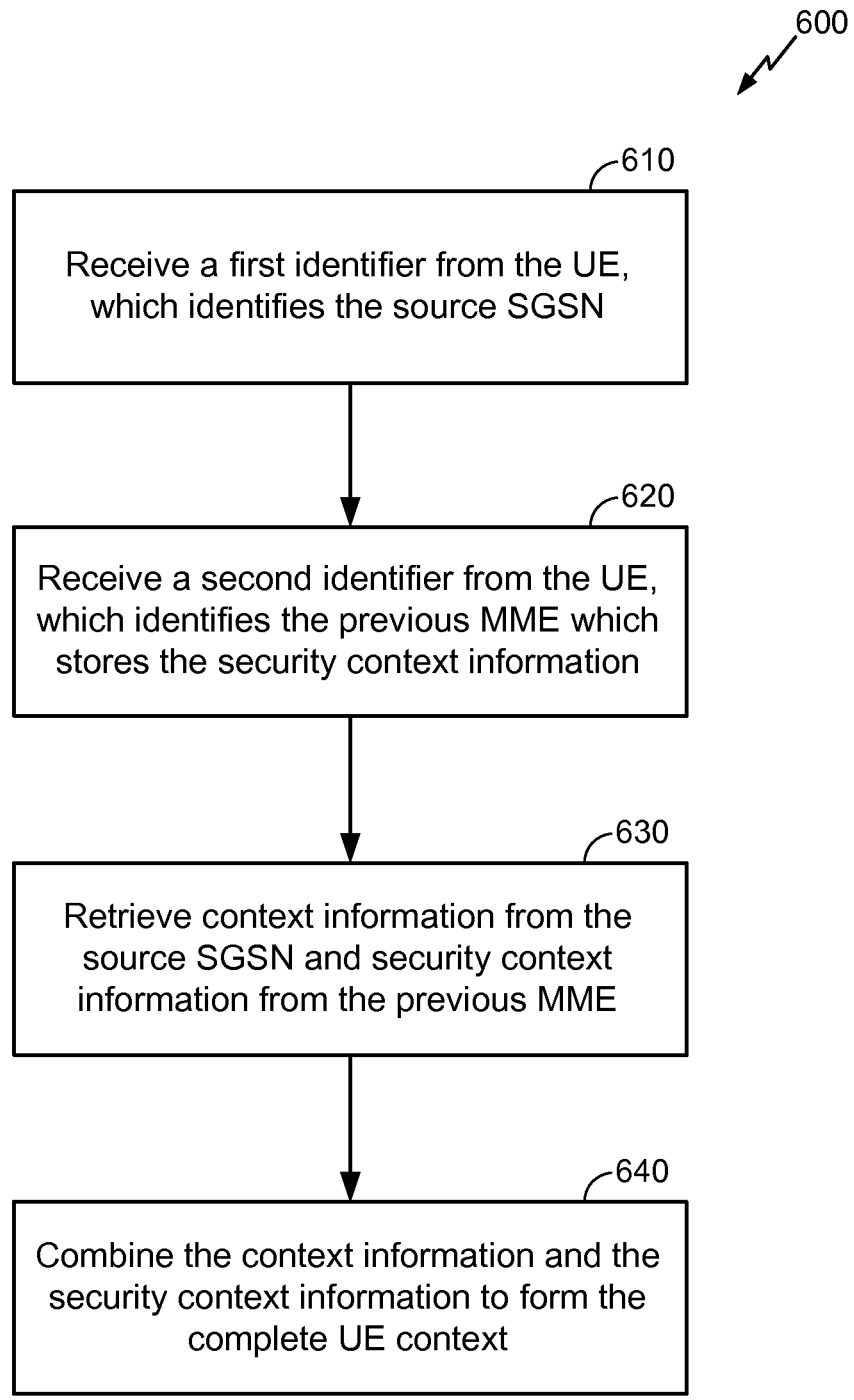
FIG. 6 is a flow diagram illustrating a method for patching a user equipment (UE) context, according to one embodiment.

For example, when the UE returns to the LTE system, the UE may further provide at least two identifiers to the target MME. One identifier may points to or identify the source SGSN, as shown at processing block 610 in FIG. 6, while the other identifier may point to the old MME that is storing the security context, as shown at processing block 620. As shown at processing block 630, the target MME may further retrieve the context information, such as, for example, the bearer configuration information, from the SGSN and the security context information from the previous MME. Finally, at processing block 640, the target MME may combine both the context information (from SGSN) and the security context information (from previous MME) to create the UE context.

In one embodiment, the context information fetched from the SGSN may contain the security context information. If the security context is included, then it may be discarded before or upon combination of the two elements.

In one embodiment, the UE may further combine the LTE security context with the rest of the context received from the source within the UTRAN system to create the same context as the one created by the target MME.

Figure 7A:
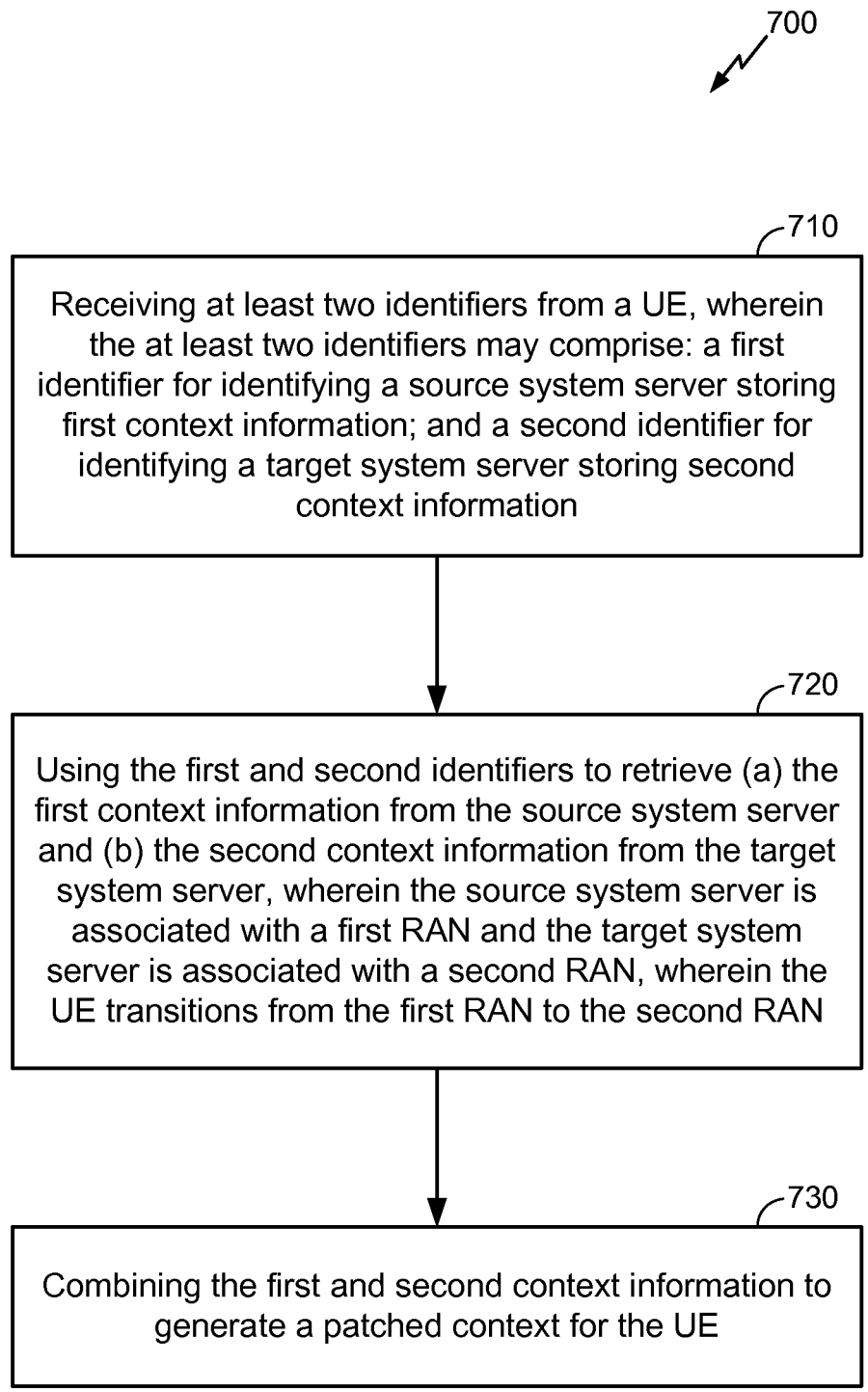
FIGS. 7A-B show one embodiment of a method for patching a UE context via retrieval of partial contexts.

In accordance with one or more aspects of the embodiments described herein, there are provided methods for patching a UE context via retrieval of partial contexts when a UE transitions from a source system (e.g., UTRAN) to a target system (e.g., an LTE network). With reference to the flow diagram shown in FIG. 7A, there is provided a method 700 that may be performed at a server or other network entity of the target system.

The method 700 may involve, at step 710, receiving at least two identifiers from a UE, wherein the at least two identifiers may comprise: a first identifier for identifying a source system server storing first context information associated with the UE; and a second identifier for identifying a target system server storing second context information associated with the UE.

The method 700 may involve, at step 720, using the first and second identifiers to retrieve (a) the first context information from the source system server and (b) the second context information from the target system server. The method 700 may involve, at step 730, combining the two sets of context information to generate a patched context for the UE. The context information stored at the source system server may comprise partial context information.

Figure 7B:
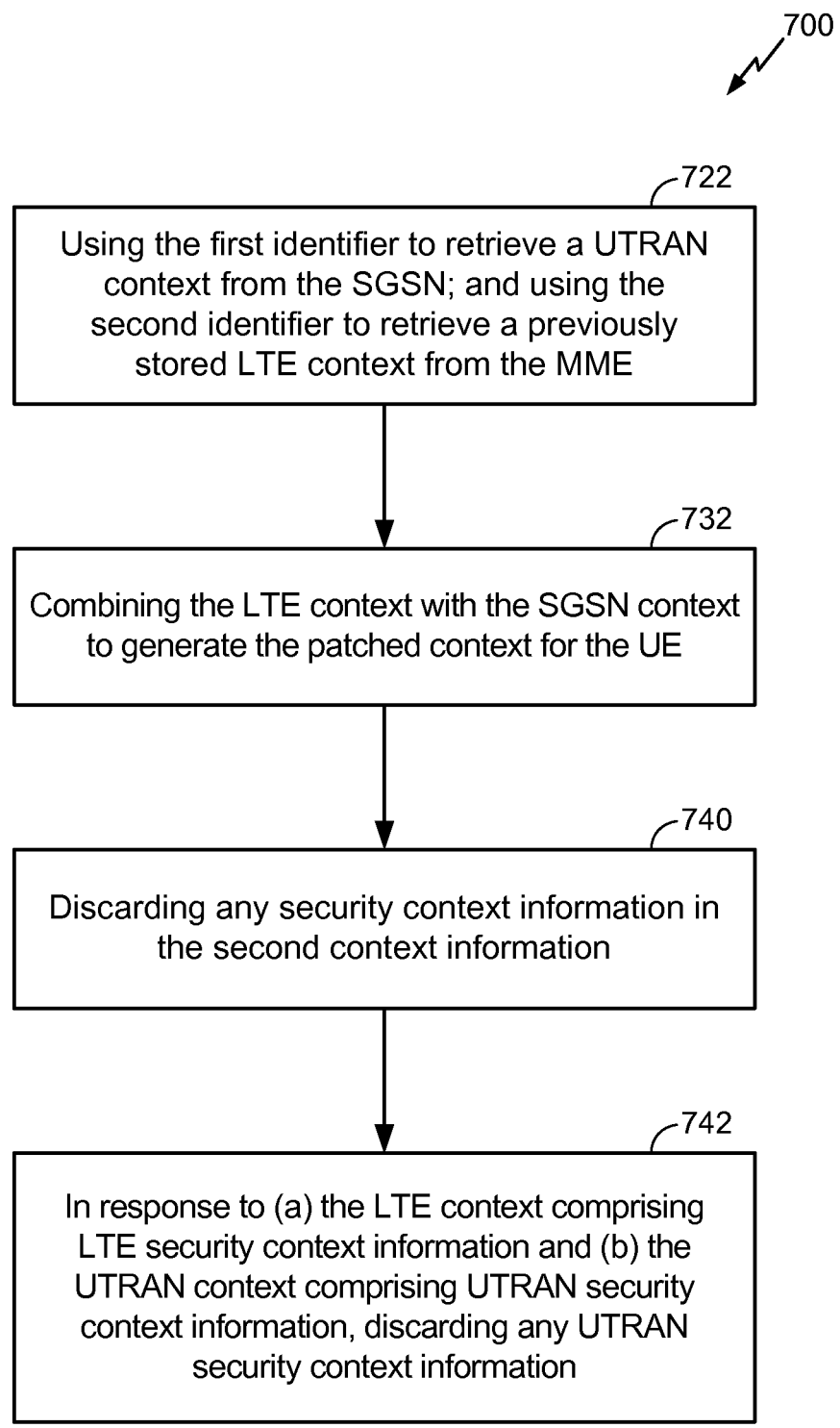

With reference to FIG. 7B, the method 700 may involve, in response to (a) both sets of context information comprising security context information, discarding any security context information in the second context information (step 740). In one embodiment, the source system server is associated with a first Radio Access Network (RAN) and the target system server is associated with a second RAN. For example, the first RAN may comprise a UMTS Terrestrial Radio Access Network (UTRAN). The second RAN may comprise an LTE network.

For example, the UE may transition from the UTRAN to the LTE network. The source system server may comprise a SGSN of the UTRAN system. The target system server may comprise an MME of the LTE system. If the method 700 is being performed by a first MME of the LTE system, then the target system server may comprise a second MME of the LTE system. For example, the second MME may maintain a previously stored LTE context for the UE.

In related aspects, step 720 may comprise: using the first identifier to retrieve a UTRAN context from the SGSN; and using the second identifier to retrieve an LTE context from the MME (step 722). In further related aspects, step 730 may comprise combining the LTE context with the UTRAN context to generate the patched context for the UE (step 732). In yet further related aspects, the method 700 may involve, in response to (a) the LTE context comprising LTE security context information and (b) the UTRAN context comprising UTRAN security context information, discarding any UTRAN security context information (step 742).

In another embodiment (not shown), a variation of method 700 may be performed at a UE or component thereof. For example, such a method would not include receiving or transmitting the at least two identifiers; rather, context information stored on the UE may be used to patch together the UE context. Such a method may involve retrieving partial context information from one or more servers.

Figure 8A:
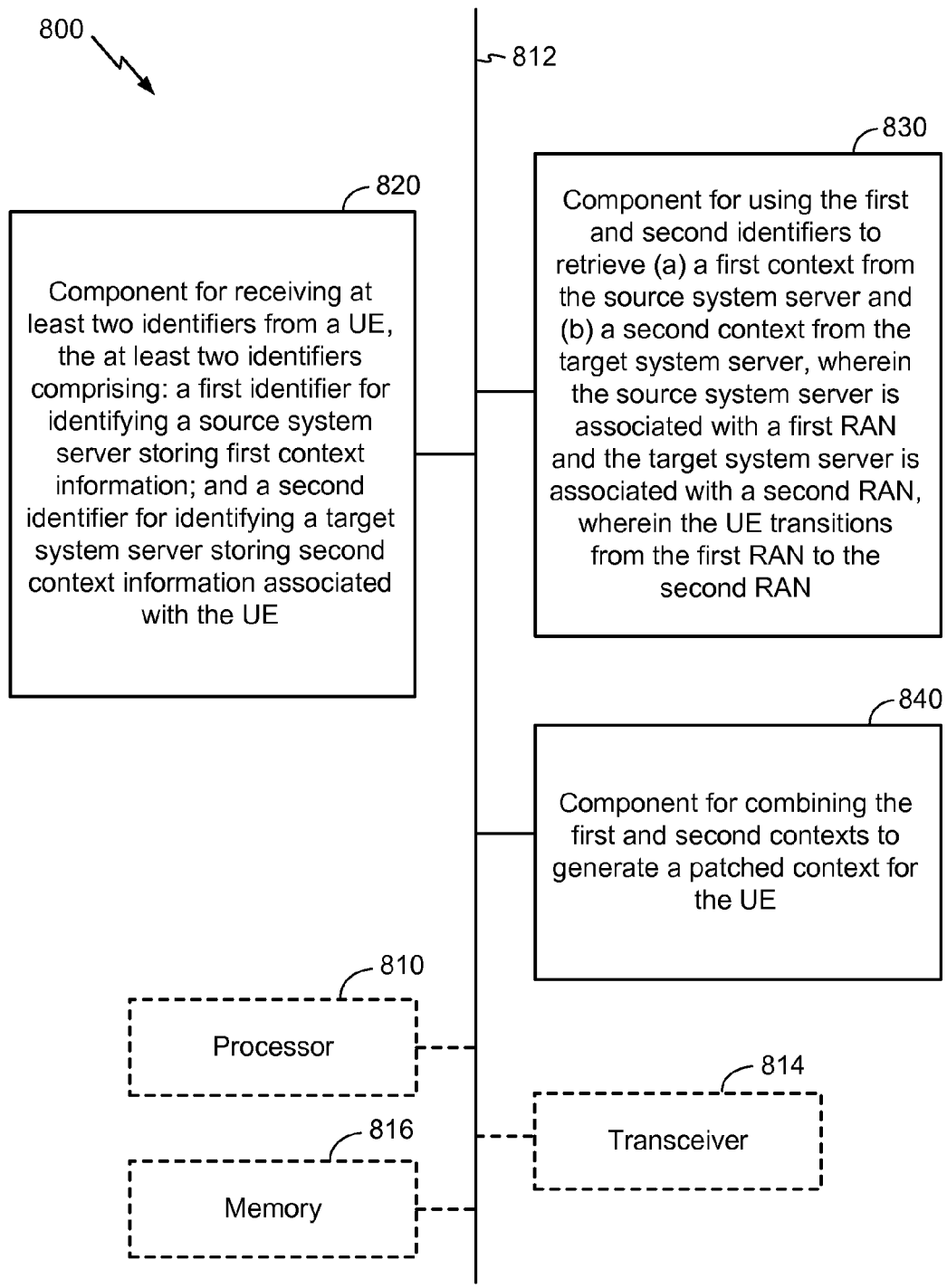
FIGS. 8A-B illustrate one embodiment of an apparatus for patching a UE context via retrieval of partial contexts.

In accordance with one or more aspects of the embodiments described herein, there are provided devices and apparatuses for patching of UE context via retrieval of partial contexts from one or more network servers. With reference to FIG. 8A, there is provided an exemplary apparatus 800 that may be configured as a server or as a processor for use within the server or as a similar network entity/device. As depicted, apparatus 800 may include functional blocks that can represent functions implemented by a processor, software, or combination thereof (e.g., firmware).

As illustrated, the apparatus 800 may comprise an electrical component 820 for receiving at least two identifiers from a user equipment (UE), the at least two identifiers comprising: a first identifier for identifying a source system server storing first context information associated with the UE; and a second identifier for identifying a target system server storing second context information associated with the UE.

The apparatus 800 may comprise an electrical component 830 for using the first and second identifiers to retrieve (a) a first context from the source system server and (b) a second context from the target system server. The apparatus 800 may comprise an electrical component 840 for combining the first and second contexts to generate a patched context for the UE.

In one embodiment, the source system server is associated with a first RAN (e.g., UTRAN) and the target system server is associated with a second RAN (e.g., LTE network). For example, the UE may transition from the UTRAN to the LTE network. The source system server may comprise a SGSN of the UTRAN system. The target system server may comprise a MME of the LTE system. The MME or another MME of the LTE may maintain a previously stored LTE context for the UE.

Figure 8B:
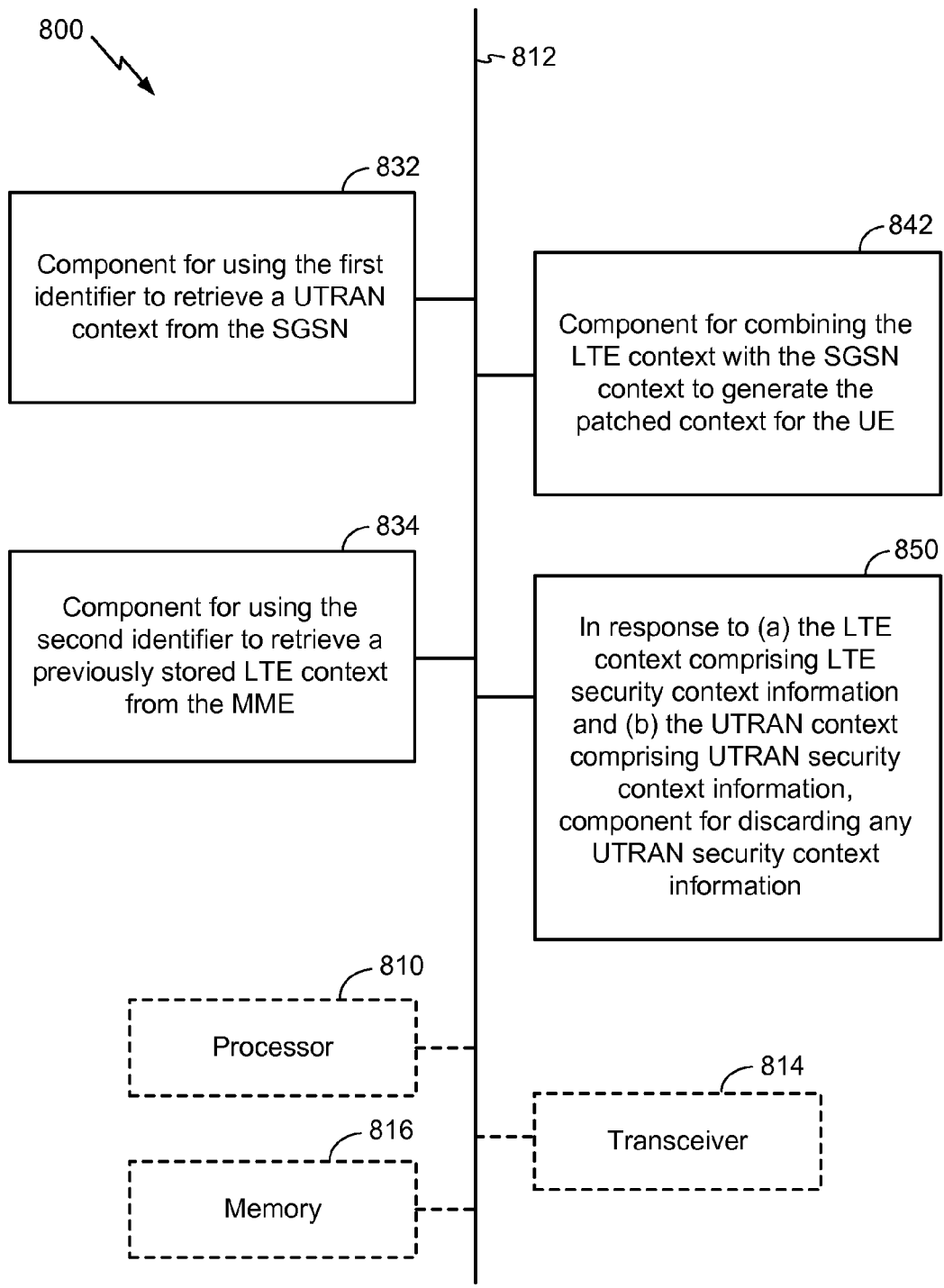

With reference to FIG. 8B, in another embodiment, the apparatus 800 may comprise an electrical component 832 for using the first identifier to retrieve a UTRAN context from the SGSN, and an electrical component 834 for using the second identifier to retrieve an LTE context from the MME. In yet another embodiment, the apparatus 800 may comprise an electrical component 842 for combining the LTE context with the UTRAN context to generate the patched context for the UE. In still another embodiment, the apparatus 800 may comprise an electrical component 850 for, in response to (a) the LTE context comprising LTE security context information and (b) the UTRAN context comprising UTRAN security context information, discarding the UTRAN security context information.

It is noted that apparatus 800 may optionally include a processor module 810 having at least one processor, in the case of apparatus 800 configured as a communication device, rather than as a processor. Processor 810, in such case, may be in operative communication with components 820-850 via a bus 812 or similar communication coupling. Processor 810 may effect initiation and scheduling of the processes or functions performed by components 820-850.

In related aspects, apparatus 800 may include a transceiver module 814. A stand alone receiver and/or stand alone transmitter may be used in lieu of or in conjunction with transceiver 814. In further related aspects, apparatus 800 may optionally include an electrical component for storing information, such as, for example, a memory device/module 816. Computer readable medium or memory device/module 816 may be operatively coupled to the other components of apparatus 800 via bus 812 or the like. The computer readable medium or memory device 816 may be adapted to store computer readable instructions and data for effecting the processes and behavior of components 820-850, and subcomponents thereof, or processor 810, or the methods disclosed herein. While shown as being external to memory 816, it is to be understood that electrical components 820-850 can exist within memory 816.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, means, and steps have been described above generally in terms of their functionality. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (not shown) may be coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. It is noted that the word "exemplary" is used exclusively herein to mean "serving as an example, instance, or illustration." Any example described herein as "exemplary" is not necessarily to be construed as preferred or advantageous over other examples.

What is claimed is:

1. A method, comprising:
receiving at least two identifiers from a user equipment (UE), the at least two identifiers comprising:
a first identifier for identifying a source system server storing first context information associated with the UE; and
a second identifier for identifying a target system server storing second context information associated with the UE;
using the first and second identifiers to retrieve (a) the first context information from the source system server and (b) a previously stored second context information associated with the UE from the target system server; and
combining the first and second context information from the source and target system servers to generate a patched context for the UE.

2. The method of claim 1, wherein:
the source system server is associated with a first radio access network (RAN) and the target system server is associated with a second RAN; and
the UE transitions from the first RAN to the second RAN.

3. The method of claim 2, wherein the step of using the first and second identifiers comprises using the first identifier to retrieve a first context from the source system server.

4. The method of claim 3, wherein the step of combining comprises combining the retrieved contexts to generate the patched context for the UE.

5. The method of claim 2, wherein the first RAN comprises a UMTS Terrestrial Radio Access Network (UTRAN).

6. The method of claim 5, wherein the second RAN comprises a Long Term Evolution (LTE) network.

7. The method of claim 6, wherein the source system server comprises a Serving GPRS Support Node (SGSN) of the UTRAN system.

8. The method of claim 7, wherein the target system server comprises a Mobility Management Entity (MME) of the LTE system.

9. The method of claim 8, wherein the MME maintains a previously stored LTE context for the UE.

10. The method of claim 9, wherein the step of using the first and second identifiers comprises:
using the first identifier to retrieve a UTRAN context from the SGSN; and
using the second identifier to retrieve the LTE context from the MME.

11. The method of claim 10, wherein the step of combining comprises combining the LTE context with the UTRAN context to generate the patched context for the UE.

12. The method of claim 10, wherein the LTE context comprises LTE security context information.

13. The method of claim 12, further comprising, in response to the UTRAN context comprising UTRAN security context information, discarding the UTRAN security context information.

14. A device, comprising:
a transceiver module for receiving at least two identifiers from a UE, the at least two identifiers comprising:
a first identifier for identifying a source system server storing first context information associated with the UE; and
a second identifier for identifying a target system server storing second context information associated with the UE;
at least one processor operatively coupled with the transceiver module; and
a memory module operatively coupled with the at least one processor and comprising executable code for the at least one processor to:
use the first and second identifiers to retrieve (a) the first context information from the source system server and (b) a previously stored second context information associated with the UE from the target system server; and
combine the first and second context information from the source and target system servers to generate a patched context for the UE.

15. The device of claim 14, wherein:
the source system server is associated with a first RAN and the target system server is associated with a second RAN; and
the UE transitions from the first RAN to the second RAN.

16. The device of claim 15, wherein the at least one processor uses the first identifier to retrieve a first context from the source system server.

17. The device of claim 16, wherein the at least one processor combines the retrieved contexts to generate the patched context for the UE.

18. The device of claim 15, wherein the first RAN comprises a UTRAN.

19. The device of claim 18, wherein the second RAN comprises an LTE network.

20. The device of claim 19, wherein the source system server comprises a SGSN of the UTRAN system.

21. The device of claim 20, wherein the target system server comprises an MME of the LTE system.

22. The device of claim 21, wherein the MME maintains a previously stored LTE context for the UE.

23. The device of claim 22, wherein the at least one processor:
uses the first identifier to retrieve a UTRAN context from the SGSN; and
uses the second identifier to retrieve the LTE context from the MME.

24. The device of claim 23, wherein the at least one processor combines the LTE context with the UTRAN context to generate the patched context for the UE.

25. The device of claim 23, wherein the LTE context comprises LTE security context information.

26. The device of claim 25, wherein the at least one processor, in response to the UTRAN context comprising UTRAN security context information, discards the UTRAN security context information.

27. An apparatus, comprising:
a first component for receiving at least two identifiers from a UE, the at least two identifiers comprising:
a first identifier for identifying a source system server storing first context information associated with the UE; and
a second identifier for identifying a target system server storing second context information associated with the UE;
a second component for using the first and second identifiers to retrieve (a) the first context information from the source system server and (b) a previously stored second context information associated with the UE from the target system server; and
a third component for combining the first and second context information from the source and target system servers to generate a patched context for the UE.

28. The apparatus of claim 27, wherein:
the source system server is associated with a first RAN and the target system server is associated with a second RAN; and
the UE transitions from the first RAN to the second RAN.

29. The apparatus of claim 28, further comprising a fourth component for using the first identifier to retrieve a first context from the source system server.

30. The apparatus of claim 29, further comprising a sixth component for combining the retrieved contexts to generate the patched context for the UE.

31. The apparatus of claim 28, wherein the first RAN comprises a UTRAN.

32. The apparatus of claim 31, wherein the second RAN comprises an LTE network.

33. The apparatus of claim 32, wherein the source system server comprises a SGSN of the UTRAN system.

34. The apparatus of claim 33, wherein the target system server comprises an MME of the LTE system.

35. The apparatus of claim 34, wherein the MME maintains a previously stored LTE context for the UE.

36. The apparatus of claim 35, further comprising:
a seventh component for using the first identifier to retrieve a UTRAN context from the SGSN; and
an eighth component for using the second identifier to retrieve the LTE context from the MME.

37. The apparatus of claim 36, further comprising a ninth component for combining the LTE context with the UTRAN context to generate the patched context for the UE.

38. The apparatus of claim 36, wherein the LTE context comprises LTE security context information.

39. The apparatus of claim 38, further comprising, in response to the UTRAN context comprising UTRAN security context information, a tenth component for discarding the UTRAN security context information.

40. An apparatus, comprising:
means for receiving at least two identifiers from a UE, the at least two identifiers comprising:
a first identifier for identifying a source system server storing first context information associated with the UE; and
a second identifier for identifying a target system server storing second context information associated with the UE;
means for using the first and second identifiers to retrieve (a) the first context information from the source system server and (b) a previously stored second context information associated with the UE from the target system server; and
means for combining the first and second context information from the source and target system servers to generate a patched context for the UE.

41. The apparatus of claim 40, wherein:
the source system server is associated with a first RAN and the target system server is associated with a second RAN; and
the UE transitions from the first RAN to the second RAN.

42. The apparatus of claim 41, further comprising means for using the first identifier to retrieve a first context from the source system server.

43. The apparatus of claim 42, further comprising means for combining the retrieved contexts to generate the patched context for the UE.

44. A computer program product, comprising:
a non-transitory computer-readable medium comprising:
code for causing a computer to receive at least two identifiers from a UE, the at least two identifiers comprising: (a) a first identifier for identifying a source system server storing first context information associated with the UE; and (b) a second identifier for identifying a target system server storing second context information associated with the UE;
code for causing a computer to use the first and second identifiers to retrieve (a) the first context information from the source system server and (b) a previously stored second context information associated with the UE from the target system server; and
code for causing a computer to combine the first and second context information from the source and target system servers to generate a patched context for the UE.

45. The computer program product of claim 44, wherein:
the source system server is associated with a first RAN and the target system server is associated with a second RAN; and
the UE transitions from the first RAN to the second RAN.

46. The computer program product of claim 45, wherein the computer-readable medium further comprises code for causing a computer to use the first identifier to retrieve a first context from the source system server.

47. The computer program product of claim 46, wherein the computer-readable medium further comprises code for causing a computer to combine the retrieved contexts to generate the patched context for the UE.

* * * * *